(12) United States Patent
Brendel et al.

(10) Patent No.: US 9,790,851 B2
(45) Date of Patent: Oct. 17, 2017

(54) IN-LINE INTERNAL COMBUSTION ENGINE HAVING A MULTI-JOINT CRANK DRIVE AND A SINGLE BALANCE SHAFT FOR DAMPING SECOND-ORDER INERTIA FORCES

(75) Inventors: Matthias Brendel, Ingolstadt (DE);
Markus Meyer, Mildenau (DE);
Karl-Heinz Hartwig, Hohenstein-Ernstthal (DE); Roger Budde, Chemnitz (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/522,444

(22) PCT Filed: Dec. 4, 2010

(86) PCT No.: PCT/EP2010/007373
§ 371 (c)(1),
(2), (4) Date: Jul. 16, 2012

(87) PCT Pub. No.: WO2011/085755
PCT Pub. Date: Jul. 21, 2011

(65) Prior Publication Data
US 2012/0285412 A1 Nov. 15, 2012

(30) Foreign Application Priority Data
Jan. 14, 2010 (DE) .......................... 10 2010 004 589

(51) Int. Cl.
*F02B 75/06* (2006.01)
*F02B 41/04* (2006.01)
(Continued)

(52) U.S. Cl.
CPC ............ *F02B 41/04* (2013.01); *F02B 75/048* (2013.01); *F02B 67/00* (2013.01); *F02B 75/06* (2013.01);
(Continued)

(58) Field of Classification Search
CPC ......... F16F 15/264; F16F 5/265; F02B 75/20; F02B 75/06; F02B 67/00
(Continued)

(56) References Cited

U.S. PATENT DOCUMENTS 2,182,988 A * 12/1939 Iseler ............................. 74/604
4,437,438 A * 3/1984 Mederer ..................... 123/48 B
(Continued)

FOREIGN PATENT DOCUMENTS

DE 102005054760 A1 5/2007
DE 102005054761 A1 5/2007
(Continued)

*Primary Examiner* — Jacob Amick
*Assistant Examiner* — Charles Brauch
(74) *Attorney, Agent, or Firm* — Henry M. Feiereisen LLC

(57) ABSTRACT

An internal combustion engine has a multi-joint crank drive wherein the multi-joint crank driver includes a plurality of coupling members which are rotatably supported on crank pins of a crank shaft and a plurality of hinged connecting rods which are rotatably supported on crank pins of an eccentric shaft wherein each of the coupling members is pivotally connected to a piston connecting rod of a piston of the internal combustion engine and one of the articulation connecting rods. In order to enable to largely or completely compensate inertia forces, it is proposed according to the invention to equip the internal combustion engine with a single balance which serves for neutralizing second order inertia forces.

16 Claims, 3 Drawing Sheets

(51) Int. Cl.
*F02B 75/04* (2006.01)
*F02B 75/20* (2006.01)
*F16F 15/26* (2006.01)
*F02B 67/00* (2006.01)

(52) U.S. Cl.
CPC ............ *F02B 75/20* (2013.01); *F16F 15/264* (2013.01); *F16F 15/265* (2013.01)

(58) Field of Classification Search
USPC ...................................... 123/192.2
See application file for complete search history.

(56) References Cited

U.S. PATENT DOCUMENTS

| | | | |
|---|---|---|---|
| 6,637,384 B1* | 10/2003 | Mendler | 123/48 B |
| 2003/0019459 A1* | 1/2003 | Ohsawa | 123/192.2 |
| 2005/0016488 A1* | 1/2005 | Kawakubo | F02B 61/02 |
| | | | 123/192.2 |
| 2007/0289567 A1* | 12/2007 | Eto et al. | 123/192.1 |
| 2008/0257296 A1* | 10/2008 | Nishi et al. | 123/192.2 |
| 2009/0000598 A1 | 1/2009 | Bach et al. | |
| 2009/0133661 A1* | 5/2009 | Schober et al. | 123/192.2 |
| 2009/0223469 A1* | 9/2009 | Rozario et al. | 123/90.17 |
| 2010/0180868 A1* | 7/2010 | Scalzo | 123/48 B |

FOREIGN PATENT DOCUMENTS

| | | |
|---|---|---|
| EP | 1 126 144 A2 | 8/2001 |
| EP | 1 659 276 A2 | 5/2006 |
| EP | 1 811 199 A1 | 7/2007 |
| EP | 1 950 390 A1 | 7/2008 |
| JP | 2004124775 A | 4/2004 |
| WO | WO 2007/057149 A | 5/2007 |

* cited by examiner

IN-LINE INTERNAL COMBUSTION ENGINE HAVING A MULTI-JOINT CRANK DRIVE AND A SINGLE BALANCE SHAFT FOR DAMPING SECOND-ORDER INERTIA FORCES

CROSS-REFERENCES TO RELATED APPLICATIONS

This application is the U.S. National Stage of International Application No. PCT/EP20101007373, filed Dec. 4, 2010, which designated the United States and has been published as International Publication No. WO 2011/085755 A1 and which claims the priority of German Patent Application, Serial No. 10 2010 004 589.6, filed Jan. 15, 2010, pursuant to 35 U.S.C. 119(a)-(d).

BACKGROUND OF THE INVENTION

The invention relates to an internal combustion engine with a multi-joint crank drive, which includes a plurality of coupling members which are rotatably supported on crank pins of a crank shaft and a plurality of articulation connecting rods which are rotatably supported on crank pins of an eccentric shaft, wherein each of the coupling members is pivotally connected to a pivotal piston connecting rod of a piston of the internal combustion engine and to one of the articulation connecting rods, characterized by a single balance shaft which serves for neutralizing second order inertia forces.

Such Internal combustion engines are for example known from DE-A-102005054761, DE-A-102005054760, EP-A-1126144, JP-A-2004124775 or WO-A-2007057149 and are often referred to as internal combustion engines with variable compression ratio or as internal combustion engines with variable piston stroke (stroke variable engine).

These internal combustion engines include an external shaft which is coupled to the crank shaft via a multi-joint crank drive. The multi-joint crank drive includes coupling members whose number corresponds to the number of cylinders, which coupling members are each rotatably supported on a crank pin of the crank shaft and two arms which protrude over the crank shaft and are provided at their ends with a pivot joint. One of the pivot joints serves for pivotally connecting a piston connecting rod which connects one of the pistons of the internal combustion engine to the crank shaft via the coupling member, while the other pivot joint serves for pivotally connecting a so called articulation connecting rod which is rotatably supported with its end on a crank pin of the eccentric shaft.

Similar to conventional internal combustion engines without an eccentric shaft which is coupled to the crank shaft via a multi-joint crank drive, second order inertia forces are also generated in internal combustion engines of the previously mentioned type as a result of oscillating masses and can change with the crank angle. For achieving a desired very smooth running and for decreasing noise these inertia forces have to be compensated as far as possible. While the first order inertia forces can be compensated by compensating weights on the crank shaft and by the crank sequence, the compensation of second order inertia forces in conventional internal combustion engines often occurs by means of two compensation shaft which rotate in opposite direction and which are driven with twice the rotational speed as the crank shaft.

However, internal combustion engines of the previously mentioned type already have higher frictional losses than conventional internal combustion engines, so that the additional frictional losses of two compensation shafts would exceed an acceptable limit.

In order to solve this problem the above mentioned JP-A-2004124775 already proposes to improve the mass compensation by favorable positions of the centers of gravity of the components of the multi-joint crank drive, which however, is not advantageous with regard to the second order inertia forces because the crank drive masses become even higher by the optimized centers of gravity.

Further, the previously mentioned EP-A-1126144 describes how the second order inertia forces in a 4 cylinder internal combustion engine in serial construction with a multi-joint crank drive can be brought below a defined threshold value by optimizing the kinematic, wherein however no reference to an improved smooth running can be found.

Other measures which are described in some of the previously mentioned documents such as in DE-A-102005054761, DE-A-102005054760 or WO-A-2007057149 also only allow for very limited compensation of the second order inertia forces, so that series internal combustion engines with multi-joint crank drive with regard to smooth running a inferior to conventional series internal combustion engines.

SUMMARY OF THE INVENTION

Based on the foregoing, the invention is based on the object to improve an internal combustion engine of the aforementioned type such that the second order inertia forces can be compensated with out a significant increase of the friction losses.

This object is solved according to the invention, in that the internal combustion engine is provided with a single balance which serves for neutralizing second order inertia forces.

Experiments have shown that with a single balance shaft it is possible to completely compensate the second order inertia forces of the type mentioned above which occur in an internal combustion engine. Because only one balance is required not only the additional frictional losses but also the additionally required construction space the additional weight and the additional costs can be limited to acceptable values.

The invention is based on the idea that the level of the second order inertia forces in an internal combustion engine of the above mentioned type with a multi-joint crank drive is on one hand already lower that in a conventional internal combustion engine with the same stroke and same oscillating mass, and on the other hand can be further decreased by a suitable configuration If the components of the multi-joint crank drive, i.e. the crank shaft, the coupling members, the piston connecting rod, the hinge rod and the eccentric shaft, as well as by a suitable kinematic or respectively, dimensioning of these components within defined limits.

While in conventional internal combustion engines the second order inertia forces only act in the direction of the cylinder axles which in in-line internal combustion engines corresponds to their vertical axis, the inertia forces in internal combustion engines of the above mentioned type with multi-joint crank drive do not only have force vectors which act in the direction of the vertical axis but also in the direction of a transverse axis which is perpendicular to the vertical axis. The respective resultant of these two force vectors has an amplitude which changes in the course of a revolution of the crank shaft and can be represented as a closed curve in an x, y coordinate plane of the internal combustion engine, which coordinate plane is perpendicular to the rotation axis of the crank shaft, via a revolution of the crank shaft. Depending on the arrangement and dimensioning of the components of the multi-joint crank drive this curve can either adopt a longitudinal bow type shape or a rather round elliptical or oval to approximately circular shape. Because in the case of an exact circular shape of the curve, a complete neutralization of the second order inertia forces would be possible by means of a single balance, a curve with a shape which approximates a circle as closely as possible, or respectively, deviates as little as possible from the circular shape is sought to be achieved by optimizing the configuration of the components of the multi-joint crank drive and the dimensioning or respectively, the kinematic of the multi-joint crank drive, wherein the force vectors are also to be as small as possible.

In order to achieve this, the configuration and dimensioning of the components of the multi-joint crank drive is chosen so that as many of the following relationships and preferably all of the following relationships are satisfied:

$$4.5 \times r\_KW < L_{P_1P_2} < 6 \times r\_KW \quad (1)$$

$$1.5 \times r\_KW < L_{P_2P_3} < 8 \times r\_KW \quad (2)$$

$$5.5 \times r\_KW < L_{P_2P_4} < 5 \times r\_KW \quad (3)$$

$$3.5 \times r\_KW < L_{P_3P_4} < 5 \times r\_KW \quad (4)$$

$$3 \times r\_KW L_{P_4P_5} < 5 \times r\_KW \quad (5)$$

$$130° < \alpha < 160° \quad (6)$$

$$0.75 \times r\_KW < S < 2 \times r\_KW \quad (7)$$

$$0.05 \times r\_EW < 0.9 \times r\_KW \quad (8)$$

$$-3 \times r\_KW < y\_EW < -8 \times r\_KW \quad (9)$$

$$-1 \times r\_KW < z\_EW < -3 \times r\_KW \quad (10)$$

wherein in these relationships:

r_KW is the curve radius, i.e. the distance of a longitudinal center axis of the crank pins of the crank shaft to the crank shaft, and for all coupling members:

$L_{P_1P_2}$ is the distance of the pivot axis of a pivot joint between a coupling member and the associated piston connecting rod to a pivot axis of a pivot joint between the piston connecting rod and the associated piston, $L_{P_1P_3}$ is the distance of the pivot axis of a pivot joint between one of the piston connecting rods and the associated coupling member to the longitudinal center axis of the crank pin of the crank shaft which is provided with the coupling member, $L_{P_2P_4}$ is the distance of the pivot axis of a pivot joint between one of the piston connecting rods and the associated coupling member to the pivot axis of a pivot joint between the coupling member and the associated hinged on piston connecting rod, $L_{P_3P_4}$ is the distance of the pivot axis of a pivot joint between one of the hinged on piston connecting rods and the associated coupling member to the longitudinal center axis of the crank pin of the crank shaft which crank pin is provided with the coupling member, $L_{P_4P_5}$ is the distance of the longitudinal center axis of a crank pin of the eccentric shaft to the pivot axis of a pivot joint between the hinged on piston connecting rod which is supported on the crank pin and the associated coupling member, A is the angle which is enclosed by two straight lines one of which connects the longitudinal center axis of a support seat of a crank pin in a coupling member with a crank axis of a pivot joint between the coupling member and the associated piston connecting rod and the other one connects the longitudinal center plane of the support seat of the crank pin in the coupling member with a pivot axis of a pivot joint between the coupling member which is supported on the crank pin and the associated hinged on piston connecting rod, S is a horizontal distance of the rotation axis of the crankshaft to a plane EZ which is defined by the cylinder axes of the internal combustion engine which distance is referred to as sewing, r_EW is the distance of the longitudinal center axes of the crank pins of the eccentric shaft to the rotation axis of the eccentric shaft, y_EW is a horizontal distance of the rotation axis of the eccentric shaft to the plane EX which is defined by the cylinder axes of the internal combustion engine in the direction of a transverse axis of the internal combustion engine, and z_EW is a vertical distance of the rotation axis of the eccentric shaft to the rotation axis of the crank shaft in the direction of a vertical axis of the internal combustion engine.

Experiments have shown that it is possible with such a configuration and dimensioning of the components of the multi-joint crank drive to almost entirely neutralize the second order inertia forces with only one balance which rotates in the second order, i.e. with twice the rotational speed of the crank shaft. Because the experiments have also shown that depending on the direction of rotation of the balance residual second order inertia forces can vary in size, a further refinement of the invention provides that the balance rotates in a direction which corresponds to the rotational direction of the crank shaft because in this case, under the aforementioned conditions, the residual non neutralized second order inertia forces are significantly lower than in the opposite rotational direction of the balance shaft.

In case of an internal combustion engine with an eccentric shaft which is driven by the crank shaft for extending the expansion stroke and which rotates in a direction which is opposite to the rotational direction of the crank shaft, the second order inertia forces can even be neutralized completely or respectively, compensated under certain boundary conditions.

Preferably the eccentric shaft and the balance are driven by the crank shaft via a common gear wheel or belt drive however, with a different reduction ratio or transmission ratio. In principle however, it is also possible to use different gear wheel drives or belt drives.

BRIEF DESCRIPTION OF THE DRAWING

In the following the invention is explained in more detail by way of an exemplary embodiment shown in the drawing. It is shown in FIG. 1 a perspective view of interacting parts of an internal combustion engine with an eccentric shaft which is coupled to the crank shaft by a multiple joint crank gear.

DETAILED DESCRIPTION OF PREFERRED EMBODIMENTS

Figure 1:
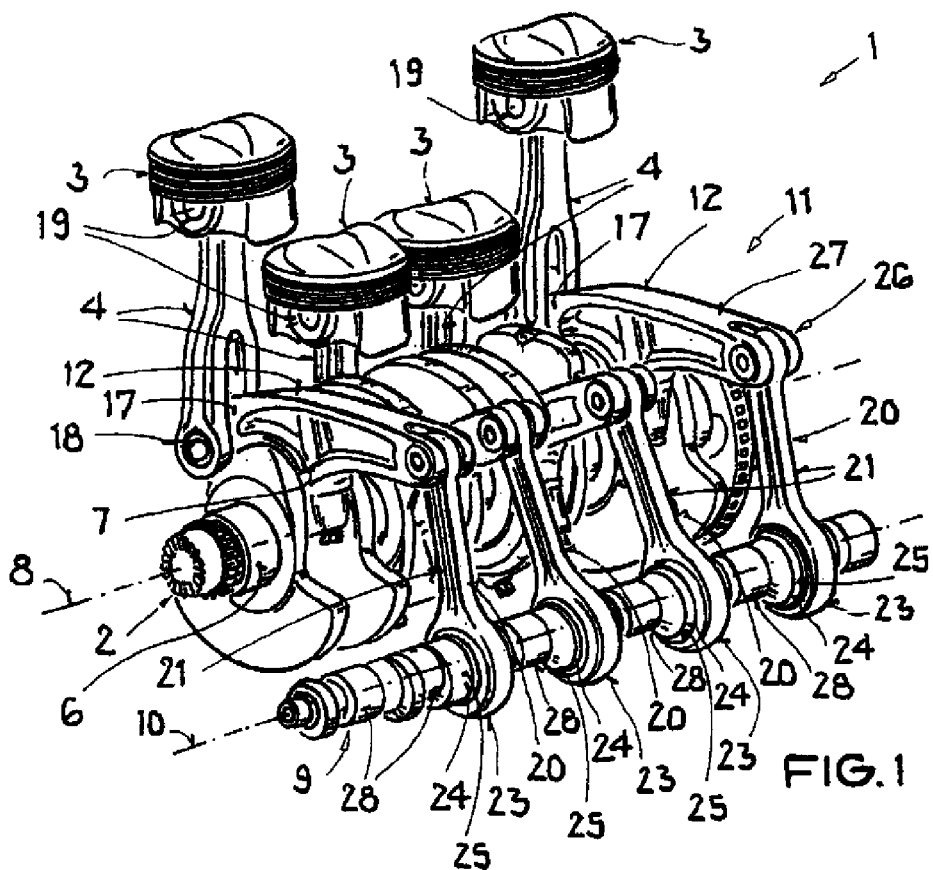

As best shown in FIG. 1, the four stroke-4-cylinder internal combustion engine 1 which is only partially shown in the drawing includes, in serial arrangement, a crank shaft 2 and four pistons 3, each of which pistons 3 is movable up and down in one of the four cylinders (not shown) of the internal combustion engine 1 and is movably connected with the crank shaft 2 via a piston connecting rod 4. The crank shaft 2 is rotatably supported in shaft bearings 5 (FIG. 5) of a cylinder crank housing (not shown) of the internal combustion engine 1 and has five centric shaft pins 6 which serve for support and four crank pins 7 (in FIGS. 1 and 2 only one respective one is shown) whose longitudinal center axes are offset parallel to the rotation axis 8 of the crank shaft 2 in different angular orientations.

The internal combustion engine 1 further includes an eccentric shaft 9 which has a rotation axis which is parallel to the rotation axis 8 of the crank shaft 2, is rotatably supported in the cylinder crank housing adjacent to the crank shaft 2 and below the latter, and is coupled to the crank shaft 2 via a multiple joint crank gear 11.

Figure 2:
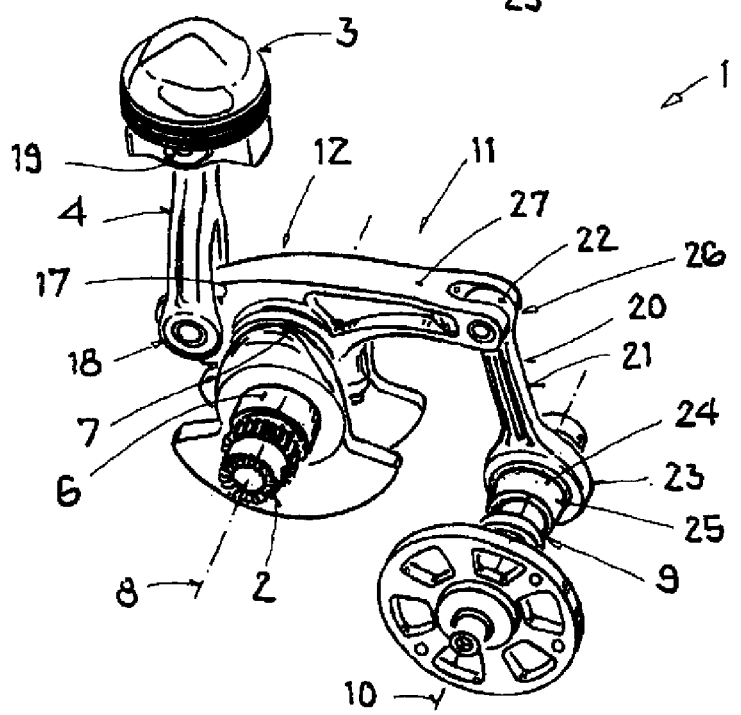
FIG. 2 another perspective view of a section of FIG. 1.
Figure 3:
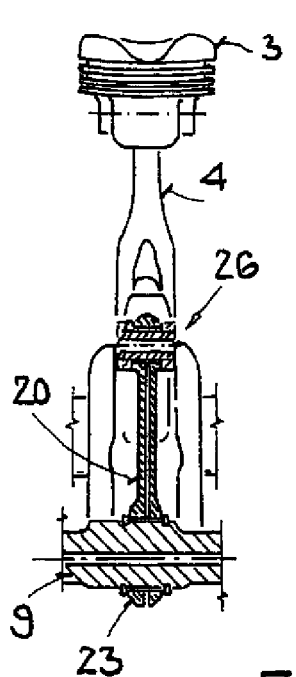
FIG. 3 a partially sectioned side view of the section of FIG. 2.

Beside the crank shaft 2 and the eccentric shaft 8 the multi-joint crank drive 11 includes overall four coupling members 12 which are each respectively rotatably supported on one of the crank pins 7 of the crank shaft 2. As best shown in FIGS. 2 and 3 each coupling member is composed of a top part 13 and a bottom part 14, which abut each other along a separating plane 15 and adjacent the separation plane 15 are provided with a semi-cylindrical recess for receiving the crank pin 7 and two bearing shells of a friction bearing which is arranged between the crank pin 7 and the coupling member 12, with the crank pin 7 being surrounded by the bearing shells. The top part 13 and the bottom part 14 of each coupling member 9 are held together by two screws. Each coupling member 12 has a shorter crank arm 17 which is pivotally connected to the lower end of one of the piston crank rods 4 via a pivot joint 18, wherein the upper end of the piston connecting rod 4 is pivotally connected to the associated piston 3 via a further pivot joint 19.

Figure 4:
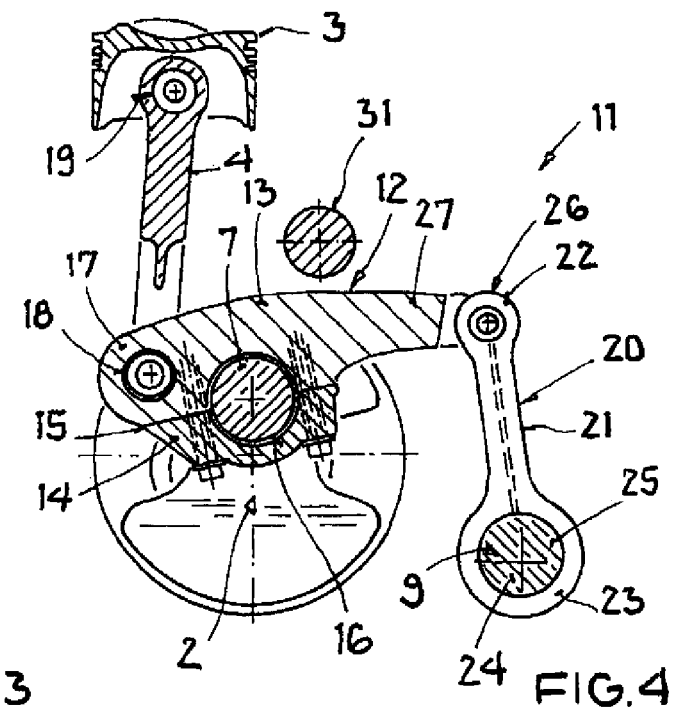
FIG. 4 a partially sectioned side view of the section from FIG. 2.

The multiple joint crank gear 11 further includes a number of articulation connecting rods 20 which corresponds to the number of the piston connecting rods 4 and the coupling members 12, which articulation connecting rods 20 are oriented approximately parallel to the piston connecting rods 4 and are arranged in about the same plane as the associated piston connecting rod 4 however, on the opposite side of the crank shaft 2. As best shown in the FIGS. 2 and 4 each articulation connecting rod 20 includes a connecting rod 21 and two connecting rod eyes 22, 23 which have different inner diameters and are arranged on opposite ends of the connecting rod 21. The greater connecting rod eye 23 of each articulation connecting rod 20 on the lower end of the connecting rod 21 surrounds a crank pin 24 of the eccentric shaft 9 which is eccentric with regard to the rotation axis 10 of the eccentric shaft 9, on which crank pin 24 the hinged connecting rod 21 is rotatably supported by means of a rotation bearing 25. The smaller connecting rod eye 22 on the upper end of the connecting rod 21 of each hinged connecting rod 20 forms a part of a pivot joint 26 between the hinged connecting rod 20 and a longer coupling arm 27 of the neighboring coupling member 8 which protrudes over the crank shaft 2 on the side of the crank shaft 2 which is opposite to the crank arm 17.

Figure 5:
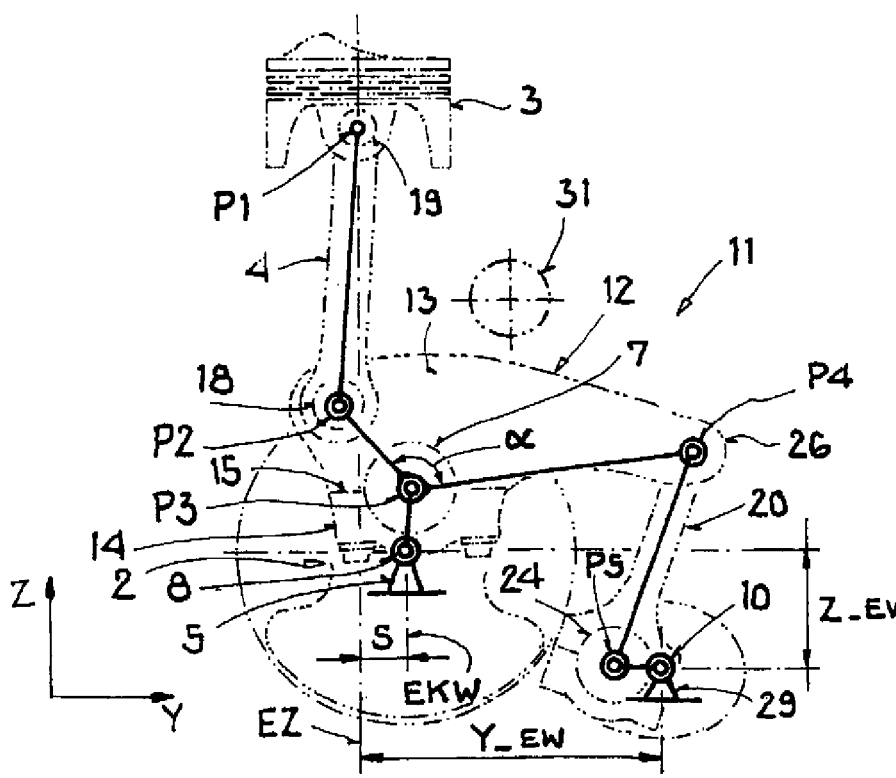
FIG. 5 a schematic representation corresponding to FIG. 4 of the different rotation joints and pivot joints of the multiple joint crank gear and different configuration parameters or respectively, dimensioning parameters.

As best shown in FIGS. 1 and 2 the eccentric shaft 9 has shaft sections 28 which are coaxial to the rotation axis 10 between the neighboring eccentric crank pins 24 and on its face ends, which shaft sections 28 serve for supporting the eccentric shaft 9 in shaft bearings 29 (FIG. 5).

Beside a variable compression the afore described arrangement also allows reducing the incline of the piston connecting rods 4 relative to the cylinder axis of the associated cylinder during the rotation of the crank shaft 2, which leads to a decrease of the piston lateral forces and with this the friction forces between the piston 2 and cylinder walls of the cylinders.

However, as in other internal combustion engines free inertia forces also occur in the internal combustion engine 1 due to the oscillating masses of the pistons 3, the piston connecting rods 4, the coupling members 9 and the articulation connecting rods 20, which free inertia forces should be compensated as much as possible to improve the running smoothness and the acoustic of the internal combustion engine 1. These free inertia forces include predominantly first order and second order inertia forces, the former of which are compensated by compensating weights 30 on the crank shaft 2 and by their crank sequence, while a single balance shaft 31 which is provided with compensating weights serves for neutralizing the latter. The balance 31 is rotatably arranged above the crank shaft 2 in the cylinder crank housing of the internal combustion engine 1 and is driven by the crank shaft 2 via a transmission drive (not shown) with twice the rotational speed of the crank shaft 2 and in a rotational direction which corresponds to the rotational direction of the crank shaft 2.

Figure 6:
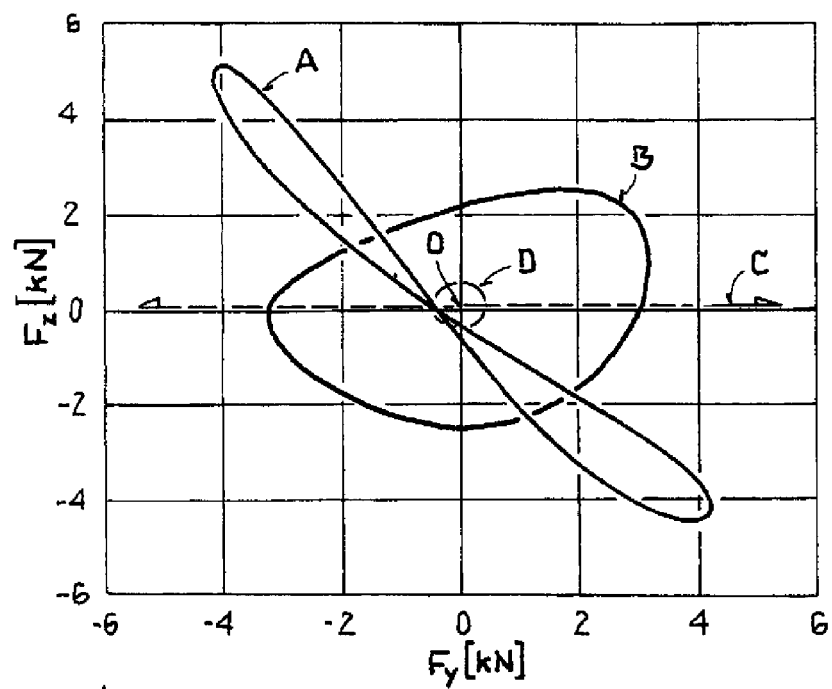
FIG. 6 a curve representation of the amplitude profile of second order inertia forces in a plane which is perpendicular to the rotation axis of the crank shaft over one revolution of the crank shaft.
Figure 7:
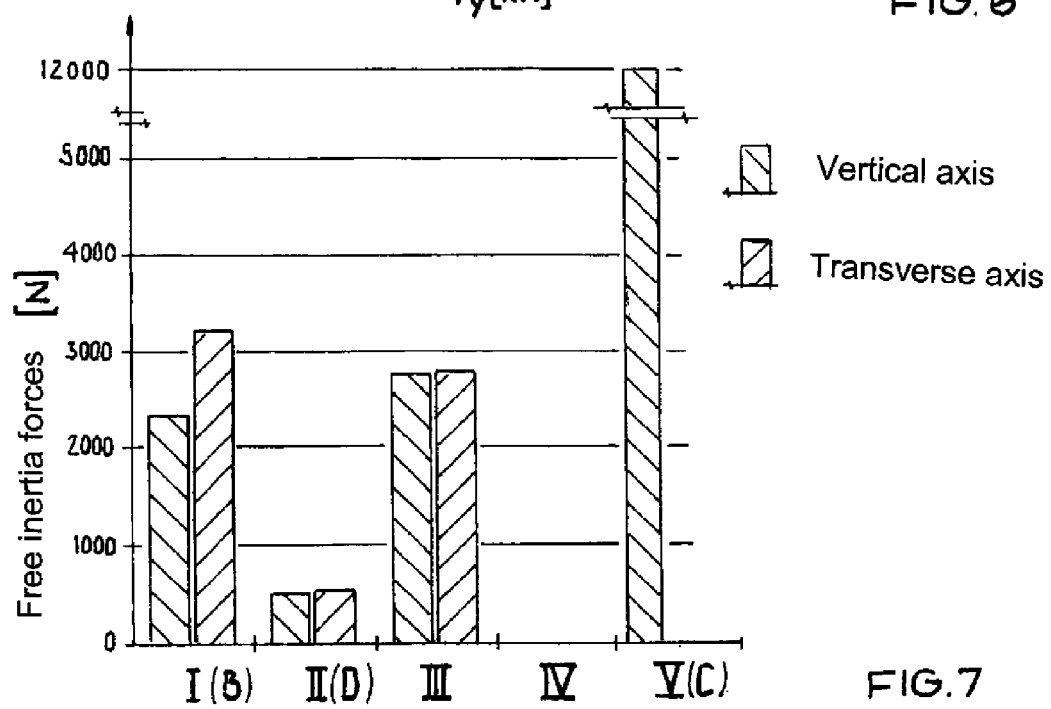
FIG. 7 a bar diagram with different bar pairs which show free second order inertia forces in the direction of a vertical or respectively, transverse axis of the internal combustion engine of different configurations of the internal combustion engine.

As best shown in FIG. 6, without such a balance shaft 31 second order inertia forces occur in the internal combustion engine, which in a Y, Z coordinate plane (FIG. 5) which is perpendicular to the rotation axis 8 of the crank shaft 2, are composed of a force vector which is oriented in the direction of the cylinder axes i.e. parallel to the Z- or vertical axis of the internal combustion engine 1 and a force vector which is oriented in a perpendicular direction to the former force vector i.e. parallel to the Y- or transverse axis of the internal combustion engine 1. These force vectors which in FIG. 6 are designated with Fz and Fy each have an amplitude which cyclically changes in the course of a revolution of the crank shaft 2, so that the tip of a resultant R of the two force vectors Fz and Fy during each revolution of the crank shaft describes a closed curve about the origin O of the coordinate system shown in FIG. 6. The curves A and B shown in FIG. 6 show the corresponding curve course for two possible examples of a configuration or respectively, kinematic of the internal combustion engine 1. In a non-optimized multiple joint crank gear 11 for example the curve course of the curve A with an elongated bow-like shape can result in which the free inertia forces cause a very irregular running and for the compensation of which two balances would be required. In contrast, in conventional internal combustion engines free second order inertia forces only occur in the direction of the vertical axis, as shown by the line C in FIG. 6. However, as exemplary shown by the black bar V on the right side of the bar diagram in FIG. 7 in conventional internal combustion engines these inertia forces are significantly higher at the same stroke and same oscillating substitute mass than the free inertia forces in the internal combustion engine 1 with the multiple joint crank gear 11, for which the bar pair which in FIG. 7 is shown furthest left shows the maximal amplitudes of the force vectors Fz and Fy in the direction of the vertical axis (black) and the transverse axis (hatched) without any neutralization.

In order to enable a neutralization of the free second order inertia forces by means of a single balance 31 and by this to reduce the friction losses of the internal combustion engine 1 as well as the additional construction space, the additional weight and the additional costs of the internal combustion engine 1 which are needed for the force compensation, the multi-joint crank drive 11 of the internal combustion engine 1 has a special configuration or respectively, kinematic which is described in the following with reference to FIG. 5.

As shown in FIG. 5, for the following discussion of the configuration or respectively, the kinematic, the pivot axis of the pivot joint 19 between a piston 3 and an associated piston connecting rod 4 is designated P1, while the pivot axis of the pivot joint 18 between the piston connecting rod 4 and the associated coupling member 9 is designated P2. Further, the longitudinal center axis of the crank pin 7 of the crank shaft 2 which crank pin 7 is provided with the coupling member 9 is designated P4. The longitudinal center axis of the crank pin 24 of the eccentric shaft which crank pin 24 is provided with the articulation connecting rod 20 is designated P5. FIG. 5 further shows an angle α between the straight line P3P2 and P3P4 and a sewing S which indicates the horizontal distance of the rotation axis 8 of the crank shaft 2 to a plane EZ which is defined by the cylinder axes of the cylinders of the internal combustion engine and or respectively, the distance between the plane EZ and a vertical plane EKW through the rotation axis 8 of the crank shaft 2 in a coordinate plane which is perpendicular to the rotation axis 8 of the crank shaft 2, in which as in FIG. 6 the Z-axis corresponds to the vertical axis of the in-line internal combustion engine 1 and the Y-axis corresponds to the horizontal transverse axis of the in-line internal combustion engine 1. In addition in FIG. 5 the horizontal distance of the rotation axis 10 of the eccentric shaft 9 to the cylinder axis plane EZ is designated y_EW and the vertical distance of the rotation axis 10 of the eccentric shaft 9 to the rotation axis of the crank shaft is designated z_EW.

In addition, in the following discussion the crank radius r_KW of the crank shaft 2 is used as reference value, which crank radius r_KW is defined as the distance of the longitudinal center axis P3 of the crank pins 7 to the rotation axis 8 of the crank shaft 2, while the crank radius r_EW of the eccentric shaft 9 indicates the distance of the longitudinal center axis P5 of the crank pins 24 of the eccentric shaft 9 to its rotation axis 10. Further, the distances between P1 and P2 are designated $L_{P1P2}$, between P2 and P3 as $L_{P2P3}$, between P2 and P4 as $L_{P2P4}$, between P3 and P4 as $L_{P3P4}$, between P4 and P5 as $L_{P4P5}$ and the piston stroke as s_K.

Calculations and tests have shown that the free second order inertia forces can be neutralized to a greater or lesser degree when the kinematic of the internal combustion engine 1 for a piston stroke of s_K=84.2 mm satisfies the following conditions $$4.5 \times r\_KW < L_{P1P2} < 6 \times r\_KW \quad (1)$$

$$1.5 \times r\_KW < L_{P2P3} < 8 \times r\_KW \quad (2)$$

$$5.5 \times r\_KW < L_{P2P4} < 5 \times r\_KW \quad (3)$$

$$3.5 \times r\_KW < L_{P3P4} < 5 \times r\_KW \quad (4)$$

$$3.0 \times r\_KW < L_{P4P5} < 5 \times r\_KW \quad (5)$$

When these conditions are satisfied the tip of the resultant R of the two force vectors $F_y$ and $F_z$ in FIG. 6 describes the curve B in during each rotation of the crank shaft, which has a rather oval or egg shaped appearance and with this more closely approximates a circular shape than curve A. A circular shape would be the optimal shape, because in this case a complete neutralization of the free second order inertia forces would be possible with only a single balance 31.

In order to more closely approximate the circular shape based on curve B and with this to achieve neutralization of the free inertia forces to the greatest possible extent the kinematic of the internal combustion engine 1 should therefore also satisfy the following conditions:

$$130° < \alpha < 160° \quad (6)$$

$$0.75 \times r\_KW < S < 2 \times r\_KW \quad (7)$$

$$0.05 \times \_KW < r\_EW < 0.9 \times r\_KW \quad (8)$$

$$-3 \times r\_KW < y\_EW < -8 \times r\_KW \quad (9)$$

$$-1 \times r\_KW < z\_EW < -3 \times r\_KW \quad (10)$$

When these conditions are satisfied and when the single balance 31 rotates in the same direction as the crank shaft 2, the tip of the resultant R of the two force vectors Fy and Fz in FIG. 6 describes during each revolution of the crank shaft a small elliptical curve D, in which the amplitude maxima of the force vectors Fz and Fy almost have the same size and are each about 500 N, as shown by the coordinates in FIG. 6 and the bar pair II of the bar diagram in FIG. 7. Compared to the curve B the free second order inertia forces can thus be decreased by an additional 70 to 80% by the above mentioned conditions as can be seen by comparing the bar pairs I and II in FIG. 7. Due to the deviation of the elliptical curve D from the circular shape however, relatively small amplitude maxima of the force vectors Fz and Fy of the free second order inertia forces of about 500 N still remain in spite of the neutralization by means of the balance shaft 31, as indicated above with reference to FIGS. 6 and 7, however, these are insignificant in practice because their amplitudes are in the order of the ones of a valve operation of the internal combustion engine. As shown by the bar pair III in FIG. 7 a reduction of the free inertia forces of the second order is not possible when the balance under the above conditions rotates in a rotational direction which is opposite to the rotational direction of the crank shaft 2. For comparison, the bar pair IV in FIG. 7 shows that the residual free second order inertia forces when neutralized by means of two balances could be completely neutralized however, the friction losses, the construction space, the weight and the costs of the internal combustion engine would in this case be significantly higher.

What is claimed is:
1. An internal combustion engine comprising:
a multi-joint crank drive, said multi-joint crank drive comprising a plurality of coupling members rotatably supported on crank pins of a crank shaft, and a plurality of articulation connecting rods rotatably supported on crank pins of an eccentric shaft, wherein each of the coupling member is pivotally connected to a piston connecting rod of a piston of the internal combustion engine and to one of the articulation connecting rods, wherein oscillations in the multi-joint crank drive generate second order inertia forces having force vectors acting in both a direction of vertical axis of the internal combustion engine which is perpendicular to the vertical axis; and a single balance shaft positioned above the crankshaft to neutralize the second order inertia forces.

2. The internal combustion engine of claim 1, wherein the second order inertia forces have a maximal amplitude during a rotation of the crank shaft, said maximal amplitude being in an order of magnitude of amplitudes of a valve drive of the internal combustion engine.

3. The internal combustion engine of claim 1, wherein components of which the multi-joint crank drive is comprised are dimensioned to satisfy the following relationship:

$$4.5 \times r\_KW < L_{P1P2} < 6 \times r\_KW$$

wherein a pivot joint between one of the coupling members and the pivot rod defines a first pivot axis, wherein another pivot joint between the pivot rod and the piston defines a second pivot axis, wherein r_KW is a curve radius defined by a distance of a longitudinal center axis of one of the crank pins of the crank shaft to a rotation axis of the crank shaft, and wherein $L_{P1P2}$ is a distance of the first pivot axis to the second pivot axis.

4. The internal combustion engine of claim 1, wherein components of which the multi-joint crank drive is comprised are dimensioned to satisfy the following relationship:

$$1.5 \times r\_KW < L_{P2P3} < 8 \times r\_KW$$

wherein a pivot joint between the piston connecting rod and one of the coupling members defines a pivot axis, wherein r_KW is a curve radius defined by a distance of a longitudinal center axis of one of the crank pins of the crank shaft to a rotation axis of the crank shaft, and wherein $L_{P2P3}$ is a distance of the pivot axis to the longitudinal center axis.

5. The internal combustion engine of claim 1, wherein components of which the multi-joint crank drive is comprised are dimensioned to satisfy the following relationship:

$$5.5 \times r\_KW < L_{P2P4} < 5 \times r\_KW$$

wherein a pivot joint between the piston connecting rod and one of the coupling members to which the piston connecting rod is connected defines a first pivot axis, wherein a pivot joint between one of the coupling members and the articulation connecting rod to which the one of the coupling members is connected defines a second pivot axis, wherein r_KW is a curve radius defined by a distance of a longitudinal center axis of one of the crank pins of the crank shaft to a rotation axis of the crank shaft, and wherein $L_{P2P4}$ is a distance of the first pivot axis to the second pivot axis.

6. The internal combustion engine of claim 1, wherein components of which the multi-joint crank drive is comprised are dimensioned to satisfy the following relationship:

$$3.5 \times r\_KW < L_{P3P4} < 5 \times r\_KW$$

wherein a pivot joint between one of the articulation connecting rods and one of the coupling members to which the one of the articulation connecting rods is connected defines a pivot axis, wherein r_KW is a curve radius defined by a distance of a longitudinal center axis of one of the crank pins of the crank shaft to a rotation axis of the crank shaft, and wherein $L_{P3P4}$ is a distance of the pivot axis to the longitudinal center axis.

7. The internal combustion engine of claim 1, wherein components of which the multi-joint crank drive is comprised are dimensioned to satisfy the following relationship:

$$3 \times r\_KW L_{P4P5} < 5 \times r\_KW$$

wherein a pivot joint between one of the articulation connecting rods and one of the coupling members which is connected to the one of the articulation connecting rods defines a pivot axis, wherein r_KW is a curve radius defined by a distance of a longitudinal center axis of one of the crank pins of the crank shaft to a rotation axis of the crank shaft, and wherein $L_{P4P5}$ is a distance of a longitudinal center axis of one of the crank pins of the eccentric shaft to the pivot axis.

8. The internal combustion engine of claim 1, wherein components of which the multi-joint crank drive is comprised are dimensioned to satisfy the following relationship:

$$130° < \alpha < 160°$$

wherein α is an angle which is enclosed by two straight lines, wherein α bearing seat of one of the crank pins in one of the coupling members defines a longitudinal center axis, wherein α pivot joint between one of the coupling members and the pivot rod to which the one of the coupling members is connected defines a pivot axis, wherein another pivot joint between another one of the coupling members and one of the articulation connecting rods to which the another one of the coupling members is connected defines another pivot axis, wherein one of said straight lines connects the longitudinal center axis to the pivot axis, and wherein another one of said two straight lines connects the longitudinal center axis with the other pivot axis.

9. The internal combustion engine of claim 1, wherein components of which the multi-joint crank drive is comprised are dimensioned to satisfy the following relationship:

$$0.75 \times r\_KW < S < 2 \times r\_KW$$

wherein r_KW is a curve radius defined by a distance of a longitudinal center axis of one of the crank pins of the crank shaft to a rotation axis of the crank shaft and wherein S is a sewing defining a horizontal distance of the rotation axis of the crank shaft to a plane, said plane being defined by cylinder axes of cylinders of the internal combustion engine.

10. The internal combustion engine of claim 1, wherein components of which the multi-joint crank drive is comprised are dimensioned to satisfy the following relationship:

$$0.05 \times r\_KW < r\_EW < 0.9 \times r\_KW$$

wherein r_KW is a curve radius defined by a distance of a longitudinal center axis of one of the crank pins of the crank shaft to the rotation axis of the crank shaft, and wherein r_EW is a distance of a longitudinal center axis of one of the crank pins of the eccentric shaft to a rotation axis of the eccentric shaft.

11. The internal combustion engine of claim 1, wherein components of which the multi-joint crank drive is comprised are dimensioned to satisfy the following relationship:

$$-3 \times r\_KW < y\_EW < -8 \times r\_KW$$

wherein r_KW is a curve radius defined by a distance of a longitudinal center axis of one of the crank pins of the crank shaft to a rotation axis of the crank shaft, and wherein y_EW is a horizontal distance of a rotation axis of the eccentric shaft to a plane, said plane being defined by cylinder axes of cylinders of the internal combustion engine in a direction of a transverse axis of the internal combustion engine.

12. The internal combustion engine of claim 1, wherein components of which the multi-joint crank drive is comprised are dimensioned to satisfy the following relationship:

$$-1 \times r\_KW < z\_EW < -3 \times r\_KW$$

wherein r_KW is a curve radius defined by a distance of a longitudinal center axis of one of the a crank pins of the crank shaft to a rotation axis of the crank shaft, and wherein z_EW is a vertical distance of a rotation axis of the eccentric shaft to the rotation axis of the crank shaft in a direction of a vertical axis of the internal combustion engine.

13. The internal combustion engine of claim 1, wherein the balance shaft rotates in a same rotational direction as the crank shaft.

14. The internal combustion engine of claim 1, wherein the balancer shaft rotates with twice a rotational speed as the crank shaft.

15. The internal combustion engine of claim 1, further comprising a cylinder crank housing disposed above the crank shaft, wherein the balancer shaft is rotatably supported in the cylinder crank housing.

16. The internal combustion engine of claim 1, wherein the eccentric shaft is driven at halve a rotational speed of the crank shaft and in a rotational direction which is opposite to a rotational direction of the crank shaft.

* * * * *

UNITED STATES PATENT AND TRADEMARK OFFICE
CERTIFICATE OF CORRECTION

PATENT NO. : 9,790,851 B2
APPLICATION NO. : 13/522444
DATED : October 17, 2017
INVENTOR(S) : Matthias Brendel et al.

Page 1 of 1

It is certified that error appears in the above-identified patent and that said Letters Patent is hereby corrected as shown below:

In the Claims

In Column 10, Claim 8, Line 6, replace "α bearing" with --a bearing-- and
Claim 8, Line 8, replace "α pivot" with --a pivot--.

Signed and Sealed this
Thirty-first Day of July, 2018

Andrei Iancu
*Director of the United States Patent and Trademark Office*